Patented June 22, 1926.

1,589,853

UNITED STATES PATENT OFFICE.

CHARLES B. HILL, OF GLENCOE, AND MAURICE H. GIVENS, OF EVANSTON, ILLINOIS, ASSIGNORS TO NORTHWESTERN YEAST COMPANY, OF CHICAGO, ILLINOIS, A CORPORATION OF ILLINOIS.

PROCESS FOR MANUFACTURING YEAST FOAM MALTED MILK AND PRODUCT THEREOF.

No Drawing. Application filed January 14, 1925. Serial No. 2,396.

This invention relates to a process for the manufacture of a new food and to the resulting product, a new and highly concentrated food for man, combining the nutritive properties of cereal flours, malted cereals and milk, with the nutritive and tonic properties of yeast in a new and hitherto unknown manner.

The objects of this invention are to provide a commercial process for the manufacture of said food and the production, in a convenient and economical manner, of a malted milk, containing yeast grown in and on the constituent materials, which has nutritive and tonic properties not equalled by any of the single constituents or by a combination of all of them mixed together in a dry state.

It is a known fact that there are several products, called malted milk, made by combining whole milk with the liquid separated from a mash of ground barley and wheat flour, with or without neutralization, and reducing the resultant mixture to a dry powder by desiccation but this product does not possess any of the nutritive and tonic properties of yeast.

Researches in developing this invention have shown, however, that it is possible to obtain a highly palatable yeast malted milk exceptionally rich in nutritive, tonic and vitamin properties and of good keeping quality, in an economical manner, by growing the yeast in and on the original basic constituents of the resulting product.

The process of this invention must be carried out at temperatures designed at times to sterilize the materials and at other periods to permit of the optimum action of the enzymes involved and the greatest growth of the yeast. These temperatures and variations therein are known to and recognized by persons skilled in this art; a specific illustration is hereinafter indicated in a specific example of the process.

The general nature of the process of this invention and of a particular product which may be made thereby having been indicated, a particular process which is within the invention will now be described, to wit:

To 100 grams of wheat flour, add 500 grams of cold water, mix thoroughly, and gelatinize all the starch by raising the temperature to 135° F, and holding at that temperature for thirty (30) minutes or longer, if necessary for complete gelatinization. Now cool this mixture to 160° F. and add to it 100 cubic centimeters of an extract of barley malt, preferably, but not necessarily prepared by soaking one part of ground barley malt with 2.3 parts of water at a temperature of 100° F. for one hour and straining this mixture through a bag and using the fluid so obtained as a malt extract. Commercial malt extract may be used without departing from the invention. Raise the temperature of this mixture to 155° F. and hold it there for two hours or longer, if necessary, until the usual iodine test for starch shows, preferably but not necessarily, that all of the starch has been inverted. Now cool this mixture to 90° F. and add to it, say, three (3) cubic centimeters of a 20% suspension of live yeast cells. Hold this temperature of 90° F. for four hours. If necessary, neutralize the mixture. To this mixture, add 330 cubic centimeters of whole milk, pasteurized. Dry this resulting mixture at not more than 40 lbs. steam pressure to destroy the fermenting power of the yeast, until it can be commercially used in any conventional manner now applied to ordinary malted milk as powder, cake, tablet or otherwise. The product is yeast foam malted milk.

While best results are obtained by using wheat flour, desirable results may be obtained by using rye, barley or oat or other cereal flour.

While best results are obtained by the use of whole milk, there is nothing in principle to prevent the use of some of the well known milk derivatives, such, for instance, as skimmed milk and butter or powdered milk, without departing from the broad invention.

It is to be understood that, where in the description and claims the expression "milk" is used, we intend thereby to mean either skimmed, partially skimmed, whole milk or reconstructed milk; and that, where the expression "malted cereal" is used, we mean thereby a malted cereal of any kind or a combination of malted cereals, or a derivative therefrom, or an extract of the same, the essential characteristic being that the cereal or cereals, the derivative or the extract be rich in enzymes. Also, it is to be understood that, where in the description and claims the expression "cereal flour" is used, we mean thereby the whole grain of any cereal crushed, or ground into flour.

Having thus described our invention, what we claim as new and desire to secure by Letters Patent is:

1. The process of manufacturing food, consisting in growing yeast in and on a nutrient solution prepared by digesting gelatinized cereal flour with malted cereal, adding milk to this mixture and drying the mixture at sufficiently high temperature to destroy the fermenting power of the yeast.

2. The process of manufacturing a new food in which yeast is grown in and on a nutritive medium prepared by mashing cereal flour with malted cereal, adding milk to this mixture and drying the mixture at sufficiently high temperature to destroy the fermenting power of the yeast.

3. The process of manufacturing a new food in which yeast is grown in and on a nutritive medium filtered or strained from cereal flour gelatinized and digested with malted cereal, adding milk to this mixture and drying the mixture at sufficiently high temperature to destroy the fermenting power of the yeast.

4. The process of manufacturing a food product, consisting in growing yeast in and on a nutritive medium of cereal flour treated with a malted cereal, adding milk to this mixture, and drying the mixture at sufficiently high temperature ot destroy the fermenting power of the yeast.

5. The process of making a food product, consisting in treating a gelatinized cereal with malt enzymes to produce a nutrient medium, reacting on the resulting product with yeast, adding milk and then reducing the product to a dry state by the use of sufficiently high temperature to thereby destroy the fermenting power of the yeast.

6. The herein described process consisting in adding to 100 parts by weight of flour approximately five times its weight of cold water, heating the mixture to, say, 185° F., holding the mixture at that temperature until substantially complete gelatinization takes place, then cooling the product slightly, to, say, 160° F., and adding approximately 100 parts by weight of extract of barley malt, then holding the mixture at, say, 155° F. until all the starch has been inverted, then cooling the mixture to, say, 90° F., and adding three parts by weight of a 20% suspension of live yeast cells and maintaining the mixture at the same temperature for about four hours so that the yeast grows on the material and finally adding about 330 parts by weight of whole milk, drying the mixture at not more than 40 pound steam pressure and powdering the dried material.

7. A food product of the character described, consisting of a yeast-fermented-malt-treated-gelatinized-cereal combined with milk.

In witness whereof, we have hereunto subscribed our names.

CHARLES B. HILL.
MAURICE H. GIVENS.